US012563195B2

(12) United States Patent
Lainema

(10) Patent No.: US 12,563,195 B2
(45) Date of Patent: Feb. 24, 2026

(54) METHOD AND AN APPARATUS FOR ENCODING AND DECODING OF DIGITAL IMAGE/VIDEO MATERIAL

(71) Applicant: Nokia Technologies Oy, Espoo (FI)

(72) Inventor: Jani Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 38 days.

(21) Appl. No.: 18/435,271

(22) Filed: Feb. 7, 2024

(65) Prior Publication Data

US 2024/0187594 A1 Jun. 6, 2024

Related U.S. Application Data

(62) Division of application No. 17/275,948, filed as application No. PCT/FI2019/050656 on Sep. 13, 2019, now abandoned.

(30) Foreign Application Priority Data

Sep. 20, 2018 (FI) ...................................... 20185782

(51) Int. Cl.
*H04N 19/129* (2014.01)
*H04N 19/132* (2014.01)
(Continued)

(52) U.S. Cl.
CPC ......... *H04N 19/129* (2014.11); *H04N 19/132* (2014.11); *H04N 19/176* (2014.11); *H04N 19/18* (2014.11); *H04N 19/46* (2014.11)

(58) Field of Classification Search
None
See application file for complete search history.

(56) References Cited

U.S. PATENT DOCUMENTS

2008/0310745 A1  12/2008  Ye et al.
2012/0099646 A1*  4/2012  Coban .................. H04N 19/176
375/240.18
(Continued)

FOREIGN PATENT DOCUMENTS

CN      103999406 A      8/2014
CN      104469384 A      3/2015
(Continued)

OTHER PUBLICATIONS

Pourazad et al., "HEVC: The new gold standard for video compression: How does HEVC compare with H. 264/AVC?", IEEE consumer electronics magazine, 1(3), pp. 36-46 (2012).*
(Continued)

*Primary Examiner* — Michael J Hess
(74) *Attorney, Agent, or Firm* — McCarter & English, LLP; Joseph C. Drish

(57) ABSTRACT

An apparatus includes at least one processor; and at least one non-transitory memory storing instructions that, when executed by the at least one processor, cause the apparatus at least to: determine a horizontal dimension of a transform block corresponding to a horizontal direction of the transform block and a vertical dimension of the transform block corresponding to a vertical direction of the transform block; determine a first transform and a second transform, wherein the first transform has smaller first coefficient for its first basis function compared to a first coefficient of a first basis function of the second transform; select the first transform having smaller first coefficient for its first basis function for the direction with the smaller dimension of the transform block and select the second transform having larger first coefficient for its first basis function for the direction with the larger dimension of the transform block.

24 Claims, 9 Drawing Sheets

(51) Int. Cl.
| | |
|---|---|
| *H04N 19/176* | (2014.01) |
| *H04N 19/18* | (2014.01) |
| *H04N 19/46* | (2014.01) |

(56) References Cited

U.S. PATENT DOCUMENTS

| | | | | |
|---|---|---|---|---|
| 2014/0064361 A1* | 3/2014 | Karczewicz | ........... | H04N 19/30 |
| | | | | 375/240.03 |
| 2014/0307801 A1* | 10/2014 | Ikai | ........................ | H04N 19/91 |
| | | | | 375/240.18 |
| 2015/0124876 A1 | 5/2015 | Lee | | |
| 2018/0020218 A1* | 1/2018 | Zhao | .................... | H04N 19/124 |
| 2018/0070106 A1 | 3/2018 | Han et al. | | |
| 2018/0199037 A1* | 7/2018 | Philippe | ............... | H04N 19/463 |
| 2018/0262777 A1 | 9/2018 | Filippov et al. | | |
| 2019/0052876 A1* | 2/2019 | Lee | ...................... | H04N 19/157 |
| 2019/0306536 A1* | 10/2019 | Lim | ...................... | H04N 19/159 |
| 2020/0177901 A1* | 6/2020 | Choi | .................... | H04N 19/176 |
| 2020/0186837 A1* | 6/2020 | Zhao | ...................... | G06F 17/147 |
| 2021/0243475 A1* | 8/2021 | Tsukuba | ............... | H04N 19/107 |

FOREIGN PATENT DOCUMENTS

| | | | |
|---|---|---|---|
| EP | | 3836543 A1 | 6/2021 |
| WO | WO-2017138791 A1 | | 8/2017 |
| WO | WO-2017171370 A1 | | 10/2017 |
| WO | WO-2017222334 A1 | | 12/2017 |
| WO | WO-2018037723 A1 | | 3/2018 |
| WO | WO-2018044088 A1 | | 3/2018 |

OTHER PUBLICATIONS

Zhang et al., "Fast DST-VII/DCT-VIII With Dual Implementation Support for Versatile Video Coding," IEEE Transactions on Circuits and Systems for Video Technology, vol. 31, No. 1, Jan. 2021.*

"Video Coding For Low Bit Rate Communication", Series H: Audiovisual and Multimedia Systems, Infrastructure of Audiovisual Services—Coding of movig Video, ITU-T Recommendation H.263, Jan. 2005, 226 pages,.

"Advanced Video Coding for Generic Audiovisual Services" Series H: Audiovisual and Multimedia Systems, Infrastructure of Audiovisual Services—Coding of moving video, Recommendation ITU-T H.264, Apr. 2017. 812 pages.

"High Efficiency Video Coding" Series H: Audiovisual and Multimedia Systems, Infrastructure of Audiovisual Services—Coding of moving video, Recommendation ITU-T H.265, Feb. 2018, 692 pages.

Office Action received for corresponding Finnish Patent Application No. 20185782, dated Apr. 24, 2019, 10 pages.

Saxena et al. "Low Latency Secondary Transforms for Intra/Inter Prediction Residual" IEEE Transactions on Image Processing, vol. 22, No. 10, Oct. 2013, pp. 4061-4071.

International Search Report and Written Opinion received for corresponding Patent Cooperation Treaty Application No. PCT/FI2019050656, dated Feb. 19, 2020, 15 pages.

Lin et al. "Prediction Dependent Transform for Intra and Inter Frame Coding" ITU-T SG 16 WP 3 and ISO/IEC JTCI/ SC 29/WG 11, Document: JVET-J0064_r1, HiSilicon Technologies, Apr. 10-20, 2018, pp. 1-6.

Chen et al. Algorithm Description of Joint Exploration Test Model 6 (JEM 6), Joint Video Exploration Team (JVET) of ITU-T SG 16 WP 3 and ISO/IEC JTC 1/SC 29/WG 11, Document: JVET-F1001-v2, Editors, Mar. 31-Apr. 7, 2017, 48 pages.

Chen et al. "Algorithm Description for Versatile Video Coding and Test Model 2 (VTM 2)" Joint Video Experts Team (JVET) of ITU-T SG 16 WP 3 and ISO/IEC JTC 1/SC 29/WG 11, Document: JVET-K1002-v2, Editors, Jul. 10-18, 2018, pp. 1-21.

"Versatile Video Coding", Series H: Audiovisual and Multimedia Systems Infrastructure of Audiovisual services—Coding of moving video, Recommendation ITU-T H.266, Aug. 2020, 516 pages.

Bross B. et al. "Versatile Video Coding (Draft 2)" 11. JVET Meeting; Jul. 11, 2018-Jul. 18, 2018; Ljubljana; (The Joint Video Exploration Team of ISO/IEC JTCI/SC29/WG11 and ITU-T SG16No. JVET-K1001 Sep. 18, 2018.

Tsukuba T. et al. "CE6-related: AMT with only Type2/Type4 DCT/DST" 11. JVET Meeting; Jul. 11, 2018-Jul. 18, 2018; Ljubljana; (The Joint Video Exploration Team of ISO/IEC JTC1/SC29/WG11 and ITU-T SG.16) No. JVET-K0394v2 Jul. 15, 2018.

\* cited by examiner

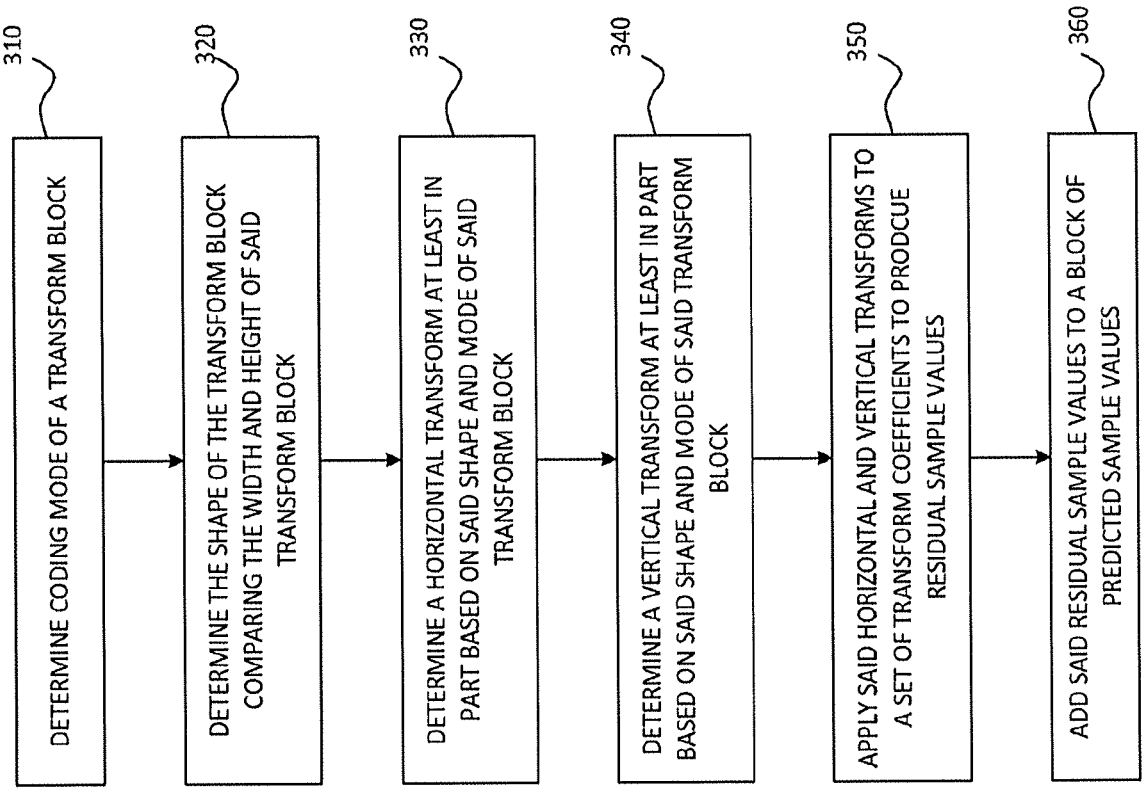

Fig. 3

310 — DETERMINE CODING MODE OF A TRANSFORM BLOCK

320 — DETERMINE THE SHAPE OF THE TRANSFORM BLOCK COMPARING THE WIDTH AND HEIGHT OF SAID TRANSFORM BLOCK

330 — DETERMINE A HORIZONTAL TRANSFORM AT LEAST IN PART BASED ON SAID SHAPE AND MODE OF SAID TRANSFORM BLOCK

340 — DETERMINE A VERTICAL TRANSFORM AT LEAST IN PART BASED ON SAID SHAPE AND MODE OF SAID TRANSFORM BLOCK

350 — APPLY SAID HORIZONTAL AND VERTICAL TRANSFORMS TO A SET OF TRANSFORM COEFFICIENTS TO PRODCUE RESIDUAL SAMPLE VALUES

360 — ADD SAID RESIDUAL SAMPLE VALUES TO A BLOCK OF PREDICTED SAMPLE VALUES

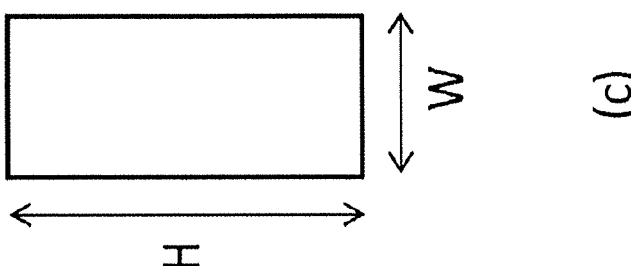
(c)
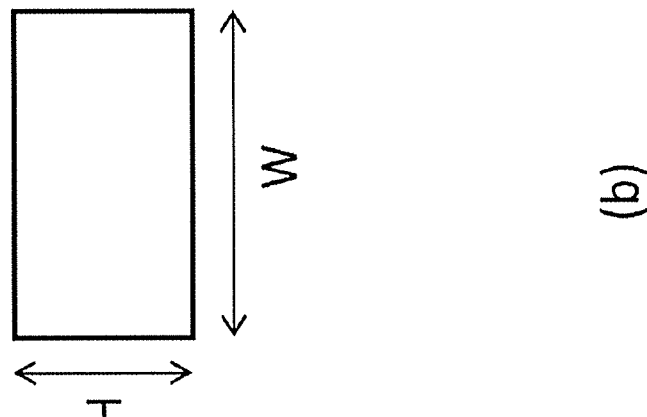
(b)
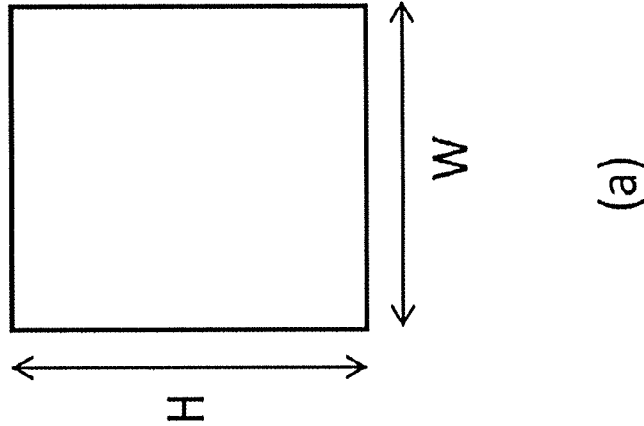
(a)
Fig. 6

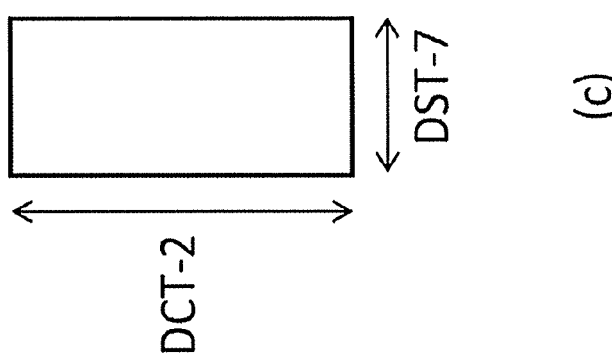
(c)
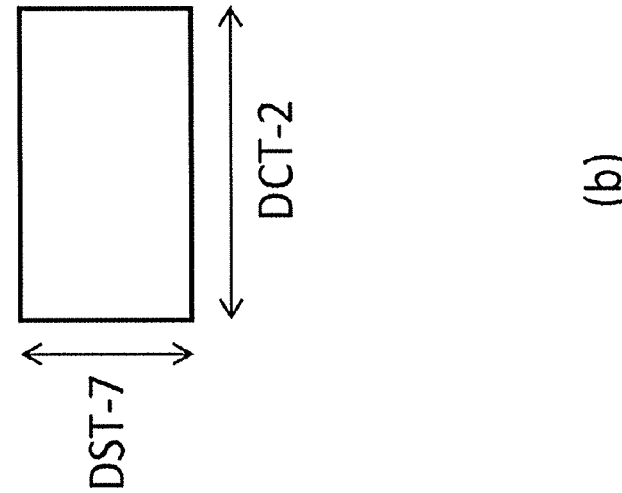
(b)
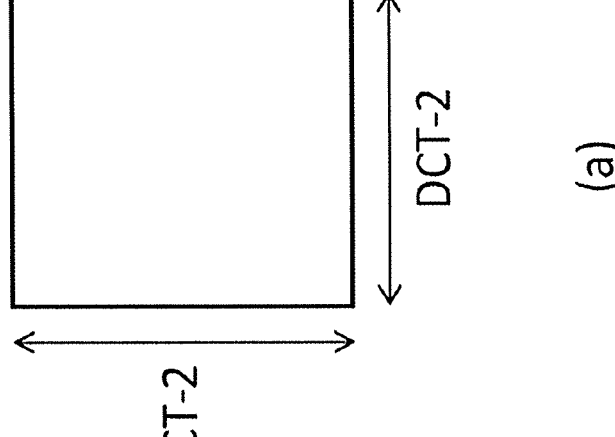
(a)
Fig. 7

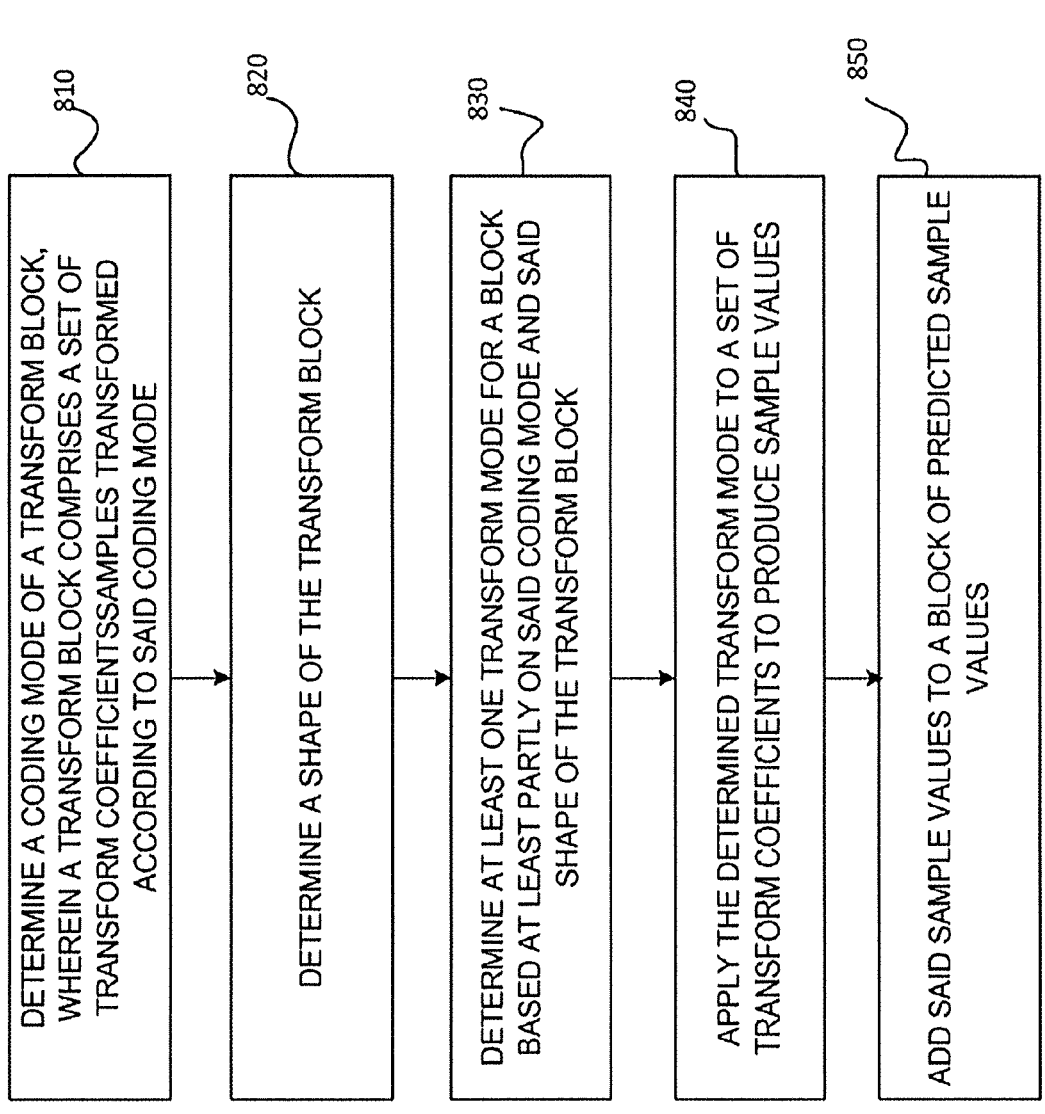

DETERMINE A CODING MODE OF A TRANSFORM BLOCK, WHEREIN A TRANSFORM BLOCK COMPRISES A SET OF TRANSFORM COEFFICIENTSSAMPLES TRANSFORMED ACCORDING TO SAID CODING MODE

820

DETERMINE A SHAPE OF THE TRANSFORM BLOCK

830

DETERMINE AT LEAST ONE TRANSFORM MODE FOR A BLOCK BASED AT LEAST PARTLY ON SAID CODING MODE AND SAID SHAPE OF THE TRANSFORM BLOCK

840

APPLY THE DETERMINED TRANSFORM MODE TO A SET OF TRANSFORM COEFFICIENTS TO PRODUCE SAMPLE VALUES

850

ADD SAID SAMPLE VALUES TO A BLOCK OF PREDICTED SAMPLE VALUES

METHOD AND AN APPARATUS FOR ENCODING AND DECODING OF DIGITAL IMAGE/VIDEO MATERIAL

RELATED APPLICATION

This application is a divisional of U.S. patent application Ser. No. 17/275,948, filed Mar. 12, 2021, which is a National Stage application of international application number PCT/FI2019/050656, filed Sep. 13, 2019, which is hereby incorporated by reference in its entirety, and this application claims priority to Finnish Application Number 20185782, filed Sep. 20, 2018, which is hereby incorporated by reference in its entirety.

TECHNICAL FIELD

The present solution generally relates to image/video encoding and decoding. In particular, the solution relates to a method and an apparatus for adaptively selecting a transform mode for a block.

BACKGROUND

A video coding system may comprise an encoder that transforms an input video into a compressed representation suited for storage/transmission, and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Hybrid video codecs may encode the video information in two phases. Firstly, sample values (i.e. pixel values) in a certain picture area are predicted, e.g., by motion compensation means or by spatial mans. Secondly, the prediction error, i.e. the difference between the prediction block of samples and the original block of samples, is coded. The video decoder on the other hand reconstructs the output video by applying prediction means similar to the encoder to form a prediction representation of the sample blocks and prediction error decoding. After applying prediction and prediction error decoding means, the decoder sums up the prediction and prediction error signals to form the output video frame.

SUMMARY

Now there has been invented an improved method and technical equipment implementing the method, by which the above problems are alleviated. Various aspects include a method, an apparatus, and a computer readable medium comprising a computer program stored therein, which are characterized by what is stated in the independent claims. Various embodiments are disclosed in the dependent claims.

According to a first aspect, there is provided a method comprising determining a coding mode of a transform block, wherein a transform block comprises a set of transform coefficients; determining a shape of the transform block; determining at least one transform mode for a block based at least partly on said coding mode and said shape of the transform block; applying the determined transform mode to a set of transform coefficients to produce sample values; and adding said sample values to a block of predicted sample values.

According to a second aspect, there is provided an apparatus comprising means for determining a coding mode of a transform block, wherein a transform block comprises a set of transform coefficients; means for determining a shape of the transform block; means for determining at least one transform mode for a block based at least partly on said coding mode and said shape of the transform block; means for applying the determined transform mode to a set of transform coefficients to produce sample values; and means for adding said sample values to a block of predicted sample values.

According to a third aspect, there is provided a computer program product comprising computer program code configured to, when executed on at least one processor, cause an apparatus or a system to determine a coding mode of a transform block, wherein a transform block comprises a set of transform coefficients; determine a shape of the transform block; determine at least one transform mode for a block based at least partly on said coding mode and said shape of the transform block; apply the determined transform mode to a set of transform coefficients to produce sample values; and add said sample values to a block of predicted sample values.

According to an embodiment, the shape of the transform block is determined by comparing the width and height of the transform block.

According to an embodiment, the direction is horizontal or vertical.

According to an embodiment, the coding mode relates to at least one of the following: a coding unit or a prediction unit is inter predicted or intra predicted; the transform block belongs to an intra slice or an inter slice; a mode of the transform; intra prediction mode of the block.

According to an embodiment, the shape of the transform block is determined by classifying the block into one of predefined categories.

According to an embodiment, two transform modes are determined for a block having two directions of different sizes.

According to an embodiment, the transform mode comprises discrete cosine transforms (DCT) or discrete sine transforms (DST).

According to an embodiment, determining the transform mode comprises selecting a discrete cosine transform (DCT) for the direction of the block with larger size and a discrete sine transform (DST) for the direction of the block with smaller size.

According to an embodiment, a bitstream includes a signal indicating the determined at least one transform modes.

According to an embodiment, the apparatus comprises at least one processor, memory including computer program code.

DESCRIPTION OF THE DRAWINGS

In the following, various embodiments will be described in more detail with reference to the appended drawings, in which

FIG. 3 shows a method according to an embodiment;

FIG. 6 shows an encoding process according to an embodiment;

FIG. 7 shows an embodiment of a shape adaptive transform process;

FIG. 8 is a flowchart illustrating a method according to an embodiment; and

DESCRIPTION OF EXAMPLE EMBODIMENTS

In the following, several embodiments will be described in the context of coding and decoding of digital image/video material. In particular, the several embodiments enable selection of a well performing transform for a transform block based on the shape of the block.

Video codec consists of an encoder that transforms the input video into a compressed representation suited for storage/transmission and a decoder that can uncompress the compressed video representation back into a viewable form. The encoder may discard some information in the original video sequence in order to represent the video in a more compact form (that is, at lower bitrate).

Hybrid video codecs, for example ITU-T H.263 and H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e. the difference between the predicted block of pixels and the original block of pixels, is coded. This may be done by transforming the difference in pixel values using a specified transform (e.g. Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Encoding process according to an embodiment is illustrated in FIG. 1.

Figure 1:
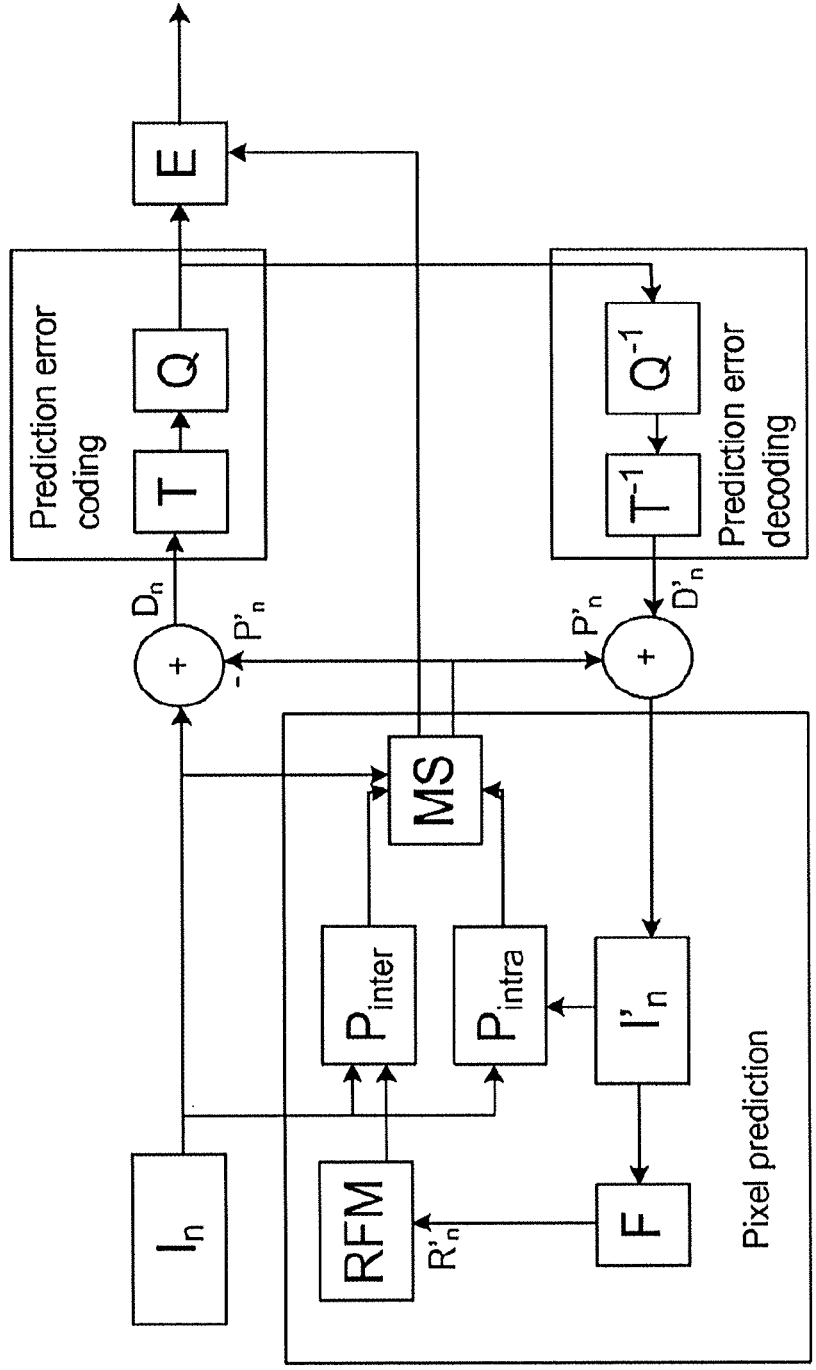
FIG. 1 shows an encoding process according to an embodiment.

FIG. 1 illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

In some video codecs, such as H.265/HEVC, video pictures are divided into coding units (CU) covering the area of the picture. A CU consists of one or more prediction units (PU) defining the prediction process for the samples within the CU and one or more transform units (TU) defining prediction error coding process for the samples in the said CU. CU may consist of a square block of samples with a size selectable from a predefined set of 20 possible CU sizes. A CU with the maximum allowed size may be named as LCU (largest coding unit) or CTU (coding tree unit), and the video picture is divided into non-overlapping CTUs. A CTU can be further split into a combination of smaller CUs, e.g. by recursively splitting the CTU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the said TU (including e.g. DCT coefficient information). It may be signaled at CU level whether prediction error coding is applied or not for each CU. In the case there is no prediction error residual associated with the CU, it can be considered there are no TUs for the said CU. The division of the image into CUs, and division of CUs into PUs and TUs may be signaled in the bitstream allowing the decoder to reproduce the intended structure of these units.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence. Decoding process according to an embodiment is illustrated in FIG. 2.

Figure 2:
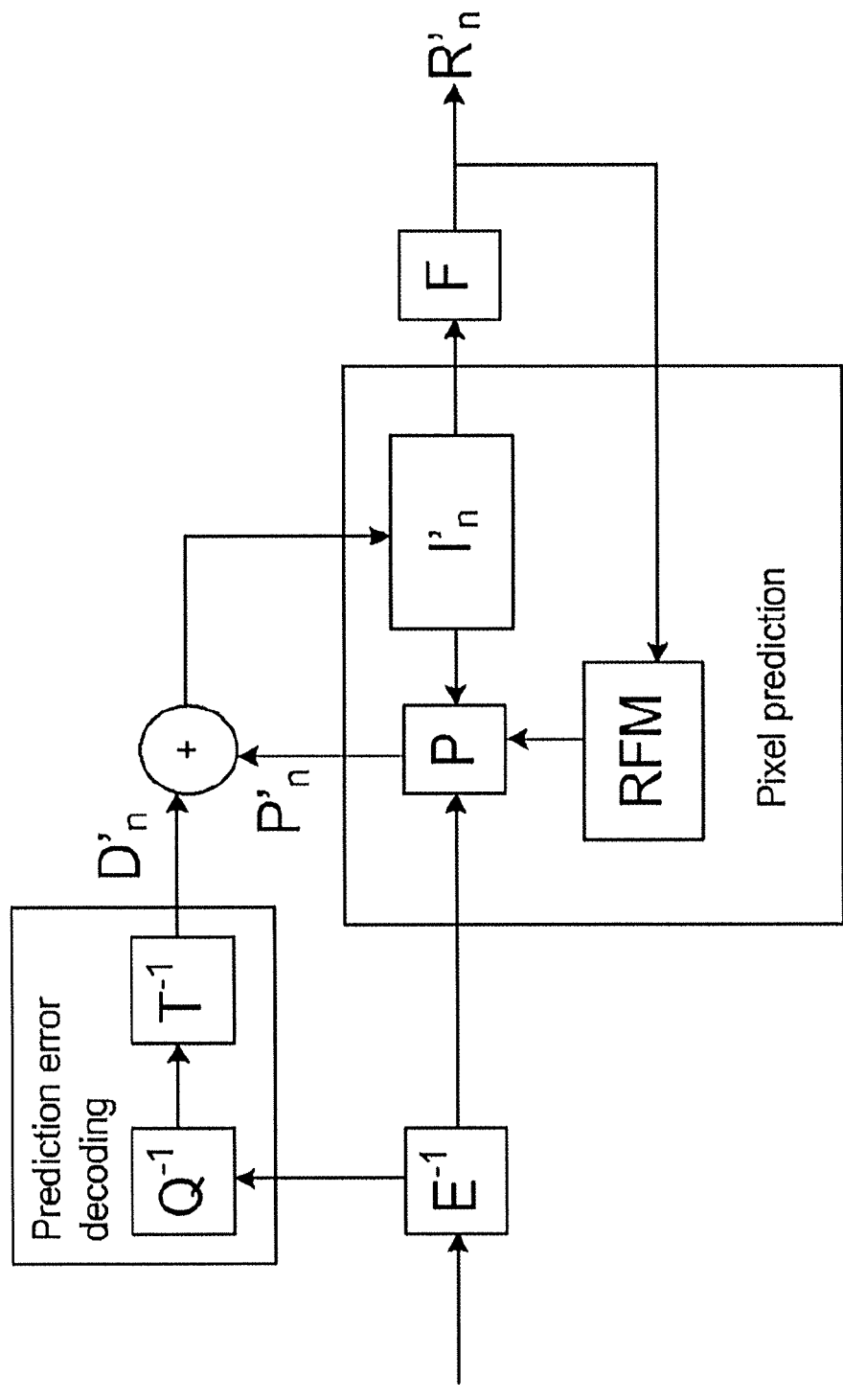
FIG. 2 shows a decoding process according to an embodiment.

FIG. 2 illustrates a predicted representation of an image block ($P'_n$); a reconstructed prediction error signal ($D'_n$); a preliminary reconstructed image ($I'_n$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Instead, or in addition to approaches utilizing sample value prediction and transform coding for indicating the coded sample values, a color palette based coding can be used. Palette based coding refers to a family of approaches for which a palette, i.e. a set of colors and associated indexes, is defined and the value for each sample within a coding unit is expressed by indicating its index in the palette. Palette-based coding can achieve good coding efficiency in coding units with a relatively small number of colors (such as image areas which are representing computer screen content, like text or simple graphics). In order to improve the coding efficiency of palette coding different kinds of palette index prediction approaches can be utilized, or the palette indexes can be run-length coded to be able to represent larger homogenous image areas efficiently. Also, in the case the CU contains sample values that are not recurring within the CU, escape coding can be utilized. Escape coded samples are transmitted without referring to any of the palette indexes. Instead their values are indicated individually for each escape coded sample.

The motion information may indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C = D + \lambda R \qquad \text{(Eq. 1)}$$

Where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may consist of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use e.g. with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability following scalability modes exist:

Spatial scalability: Base layer pictures are coded at a lower resolution than enhancement layer pictures.

Bit-depth scalability: Base layer pictures are coded at lower bit-depth (e.g. 8 bits) than enhancement layer pictures (e.g. 10 or 12 bits).

Chroma format scalability: Enhancement layer pictures provide higher fidelity in chroma (e.g. coded in 4:4:4 chroma format) than base layer pictures (e.g. 4:2:0 format).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame-based scalability codec can be implemented by utilizing the same hardware or software implementation for all the layers, just taking care of the DPB management by external means.

In order to be able to utilize parallel processing, images can be split into independently codable and decodable image segments (slices or tiles). "Slices" in this description may refer to image segments constructed of certain number of basic coding units that are processed in default coding or decoding order, while "tiles" may refer to image segments that have been defined as rectangular image regions that are processed at least to some extend as individual frames.

In modern video and image codecs, prediction error may be transformed into frequency domain and quantized into desired accuracy. This transformation can be done for example using a transform mode from the family of discrete cosine transforms (DCT) or discrete sine transforms (DST). In a video or image decoder the received transform coefficients are inverse quantized and inverse of the selected transform is applied to these inverse quantized transform coefficients to recover the prediction error signal in spatial or sample domain. The selected transform or inverse transform can be indicated in the bitstream separately for the horizontal and vertical directions. However, that may lead to increased number of bits needed to signal the selected transform and increased burden on the encoder side to evaluate effectiveness of different transform alternatives.

H.265/HEVC video coding standards defines two different types of transforms that are used in prediction error coding. DST transform is used for 4×4 intra predicted luma blocks, while DCT transform is used for the rest of the blocks. H.265 also defines a "transform skip" mode, where the sample values are not transformed into frequency domain but transmitted as quantized sample values.

The Versatile Video Coding (VVC) test model number 2 (VTM-2) defines a mechanism to select between different combinations of DCT-2, DCT-8 and DST-7 transform modes. Encoder can select between using DCT-2 for both horizontal and vertical direction, or alternatively select a combination of DCT-8 and DST-7 transforms for different directions. The selection is indicated in the bitstream and decoder is expected to perform a matching inverse transform to recover the prediction error signal.

The Joint Exploration Test Model 6 (JEM-6) defines a mechanism for "mode-dependent non-separable transform" coding where depending on the intra prediction mode different transform basis functions are selected for the transform block. Similarly, the "adaptive multiple core transform" defines a mechanism that selects a different transform pair for horizontal and vertical directions based on the intra prediction direction.

The present embodiments provide a method for selecting a well performing transform for a transform block based on the shape of the block. A video or image decoder operating according to the method has two alternative transforms for the horizontal and vertical direction. One of the transforms is characterized with a smaller first coefficient for its first basis function, and another of the transforms is characterized with a larger first coefficients for its first basis function. Such a pair of transforms can be defined for example using a (DST-7, DCT-2) pair. The decoder is further configured to select the transform with smaller first coefficient for the first basis function for the direction of the smaller dimension of the transform block, and the transform with larger first coefficient for the first basis function for the direction of the larger dimension of the transform block.

The method according to an embodiment comprises the following steps, as shown in FIG. 3:

1. Determine 310 a coding mode of a transform block;
2. Determine 320 the shape of said transform block, e.g. by comparing the width and height of said transform block;
3. Determine 330 a horizontal transform based at least in part on said shape and mode of said transform block;

4. Determine 340 a vertical transform based at least in part on said shape and mode of said transform block;
5. Apply 350 said horizontal and vertical transforms to a set of transform coefficients to produce residual sample values;
6. Add 360 said residual sample values to a block of predicted sample values.

The method can be performed by a video or image decoder/encoder.

The above method can be implemented in different ways. For example, the order of operations can be changed or the operations can be interleaved in different ways. Also, different additional operations can be applied in different stages of the processing. For example, there may be additional filtering or other processing applied to the residual sample values before adding those to the predicted sample values.

Determining the coding mode of a transform block may include determining if a coding unit or a prediction unit into which the transform block belongs to is inter predicted or intra predicted. It may also include determining if the transform block belongs to an intra slice or an inter slice. In addition or instead of, it may also include determining mode of the transform. For example, it may be signaled with a flag in a bitstream that a transform block is using the default transforms for the block. In the case the default transform mode is used, the shape adaptive transform selection process described here may be invoked. Such an example is shown in FIG. 4.

Figure 4:
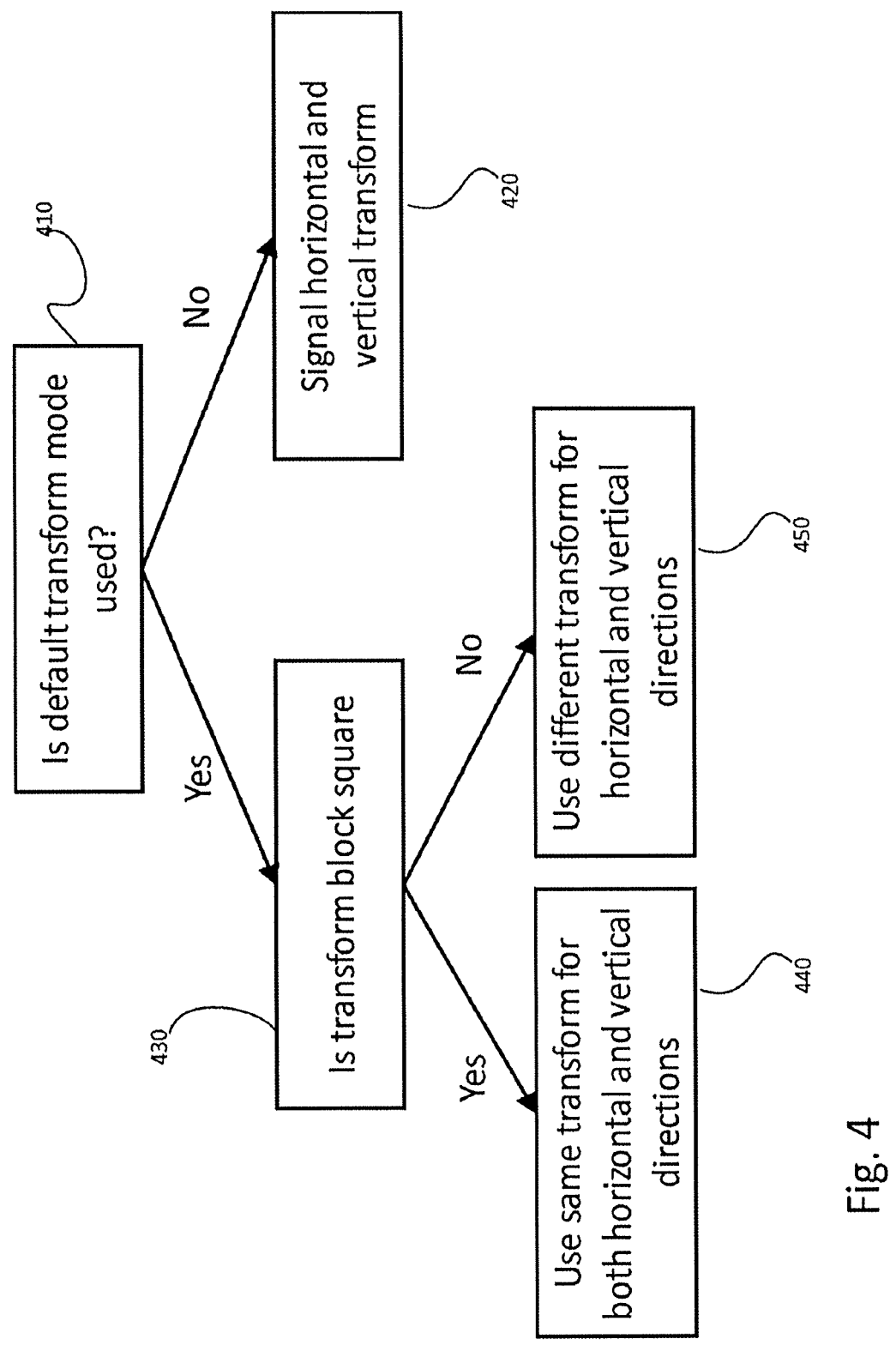
FIG. 4 shows an example of different shapes of transform blocks.

FIG. 4 illustrates an example of an encoding process when signaling for a default transform is employed and when the default transform utilizes shape adaptive transform selection. At first it is determined 410, whether a default transform is used. If not, a horizontal and vertical transforms are signaled 420. On the other hand, if the default transform mode is used, it is then determined if the transform block is square 430. If yes, then the same transform for both horizontal and vertical direction is used 440. If not, then different transforms for horizontal and vertical direction are used 450.

Figure 5:
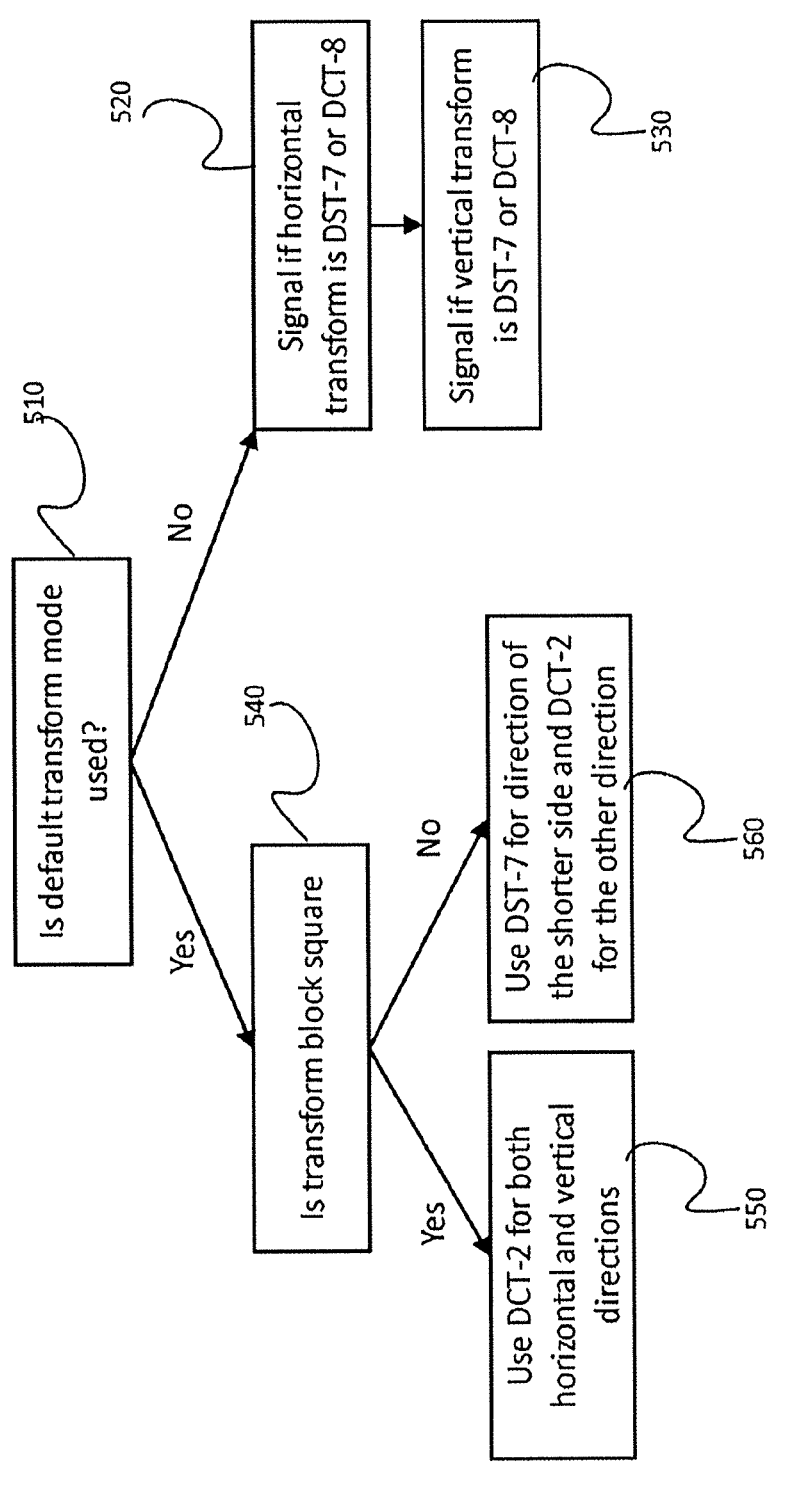
FIG. 5 shows a transform selection according to an embodiment.

In the case, where the default transform mode is not indicated, there may be a separate signaling determining which transform is applied in horizontal direction and which transform is applied in vertical direction. This has been illustrated in FIG. 5. In FIG. 5, a shape adaptive transform process selects a transform between DST-7 and DCT-2, while the explicit signaling of transforms is used to select between DST-7 and DCT-8 transforms. At first it is determined 510, whether a default transform is used. If not, it is signaled 520 if a horizontal transform is DST-7 or DCT-8 or some other, and it is signaled 530 if a vertical transform is DST-7 or DCT-8 or some other. On the other hand, if the default transform mode is used, it is then determined if the transform block is square 540. If yes, then the same transform, e.g. DCT-2, for both horizontal and vertical direction is used 550. If not, then different transforms for horizontal and vertical direction are used 560, for example, DST-7 for direction of shorter side and DCT-2 for the other direction.

Determination of the shape of the block can be done in different ways. It can, for example, include classifying the block in one of the three categories, also shown in FIG. 6: a) square (width W of the block is identical to the height H of the block), b) wide (width W of the block is larger than the height H) and c) narrow (height H of the block is larger than the width W). It is appreciated that additional categories may be defined. For example, there can be separate categories for blocks with width twice the height of the block and width more than twice the height of the block.

Similarly, there can be separate categories for blocks with height twice the width of the block and height more than twice the width of the block.

In an embodiment, the shape adaptive transform selection is operated to select between two transforms: the first transform characterized with a smaller first coefficient for its first basis function and one characterized with a larger first coefficient for its first basis function. Such a pair of transforms can be defined for example using transform mode comprising a (DST-7, DCT-2) pair. In an embodiment, the decoder is further configured to select the transform with smaller first coefficient for the first basis function (DST-7) for the direction of the smaller dimension of the transform block and the transform with larger first coefficient for the first basis function (DCT-2) for the direction of the larger dimension of the transform block.

According to an embodiment being illustrated in FIG. 7, the shape adaptive transform process selects a transform mode between DST-7 and DCT-2. DST-7 transform is selected for the shorter direction of the transform block, and DCT-2 is used for the longer direction of the transform block, or if the transform block is square. Thus, in this embodiment, DCT-2 is used for both horizontal and vertical directions if the transform block is square (FIG. 7, a). If the width of the block is larger than the height, as shown in FIG. 7 b), DCT-2 is used for horizontal and DST-7 is used for the vertical direction. If the height of the block is larger than the width, as shown in FIG. 7 c), DCT-2 is used for the vertical and DST-7 is used for the horizontal direction.

Different kinds of transforms or different sets of transforms can be used in different embodiments. In one embodiment the DCT-2 and DST-7 transforms are used. In another embodiment DCT-2, DST-7 and DCT-8 transforms (e.g. as defined in working draft 2 of VVC standard) are used. If there are more than two transforms to select from, the shape adaptivity can be enabled for some or all the transform modes that can be indicated in the bitstream. As an example, the shape adaptive transform selection can be enabled conditional to a MTS_CU_flag (multiple transform selection for coding unit flag) as defined in the following pseudo-code:

```
if ( MTS_CU_flag )
    indicate explicitly what transform to use for horizontal
and vertical directions
else {
    if ( coding unit is intra coded )
        apply shape adaptive transform selection according to an
embodiment
    else
        apply DCT-2 for both horizontal and vertical direction
}
```

Different conditions can be used to enable the shape adaptive transform selection process. In the above example, the coding mode (inter or intra) is used. Other examples include determining if the current slice is intra coded or combining different conditions. For example, the condition may contain determining the intra prediction mode of the block and enabling shape adaptive transform selection for certain combination of prediction modes or prediction direction and shapes.

In an embodiment, the shape of the block is used to give priority (or shorter binarization for related syntax elements or different context for context adaptive arithmetic coding) for certain transforms. For example, if the codec is configured to select between DCT-2, DST-7 and DCT-8 transforms for both horizontal and vertical directions, a shorter binary codeword is used for DST-7 for the shorter dimension of the block. That is, the binarized codeword for selecting DST-7 for vertical direction for blocks with width larger than height can be 0, whereas binarized codewords for DCT-2 and DCT-8 can be 10 and 11 (or 11 and 10), respectively. For the same block, the binarized codewords for horizontal transform could be 0 for DCT-2, and DST-7 and DCT-8 could have binarized codewords or 10 and 11, respectively. Similarly, instead or in addition to binarization of the codewords for different transform selections, the context and initial probability selection for context adaptive arithmetic coding of the syntax elements can be configured to provide the adaptivity or prioritization of specific transforms.

In the case there is signaling related to selection of the transform (e.g. if there is a MTS_CU_flag and that indicates the selection of transform by explicit additional signaling), the signaling can be conditioned to the position of the last non-zero coefficient of the transform block in selected scan order. In addition or instead, the explicit signaling of the horizontal and vertical transforms can be done before transform coefficient coding in the encoder and before the transform coefficient decoding in a decoder. Unlike the signaling defined for VTM-2, where the explicit signaling of transforms takes place after the transform coefficient coding and decoding, and is conditioned to the number of active coefficients in a transform block, the proposed approach of conditioning the signaling to the position of the last active transform coefficient allows the coefficient coding and decoding processes to be adapted based on the transforms selected.

According to an embodiment, explicit or implicit signaling of transform types for horizontal and vertical direction is performed prior to transform coefficient decoding.

According to an embodiment, explicit or implicit signaling of transform types for horizontal and vertical directions is performed prior to transform coefficient decoding and transform coefficient decoding is adapted based on the determined type of the transforms.

According to an embodiment, explicit or implicit signaling of transforms types for horizontal and vertical directions is performed if scan position of the last non-zero transform coefficient is larger than a predefined threshold.

According to an embodiment, 8-point transform matrices for DCT-2, DCT-8 and DST-7 are defined using the following coefficients:

| DCT-2: | | | | | | | |
|---|---|---|---|---|---|---|---|
| 256 | 256 | 256 | 256 | 256 | 256 | 256 | 256 |
| 355 | 301 | 201 | 71 | −71 | −201 | −301 | −355 |
| 334 | 139 | −139 | −334 | −334 | −139 | 139 | 334 |
| 301 | −71 | −355 | −201 | 201 | 355 | 71 | −301 |
| 256 | −256 | −256 | 256 | 256 | −256 | −256 | 256 |
| 201 | −355 | 71 | 301 | −301 | −71 | 355 | −201 |
| 139 | −334 | 334 | −139 | −139 | 334 | −334 | 139 |
| 71 | −201 | 301 | −355 | 355 | −301 | 201 | −71 |

| DCT-8: | | | | | | | |
|---|---|---|---|---|---|---|---|
| 350 | 338 | 314 | 280 | 237 | 185 | 127 | 65 |
| 338 | 237 | 65 | −127 | −280 | −350 | −314 | −185 |
| 314 | 65 | −237 | −350 | −185 | 127 | 338 | 280 |
| 280 | −127 | −350 | −65 | 314 | 237 | −185 | −338 |
| 237 | −280 | −185 | 314 | 127 | −338 | −65 | 350 |
| 185 | −350 | 127 | 237 | −338 | 65 | 280 | −314 |

-continued

| DCT-8: | | | | | | | |
|---|---|---|---|---|---|---|---|
| 127 | −314 | 338 | −185 | −65 | 280 | −350 | 237 |
| 65 | −185 | 280 | −338 | 350 | −314 | 237 | −127 |

| DST-7: | | | | | | | |
|---|---|---|---|---|---|---|---|
| 65 | 127 | 185 | 237 | 280 | 314 | 338 | 350 |
| 185 | 314 | 350 | 280 | 127 | −65 | −237 | −338 |
| 280 | 338 | 127 | −185 | −350 | −237 | 65 | 314 |
| 338 | 185 | −237 | −314 | 65 | 350 | 127 | −280 |
| 350 | −65 | −338 | 127 | 314 | −185 | −280 | 237 |
| 314 | −280 | −65 | 338 | −237 | −127 | 350 | −185 |
| 237 | −350 | 280 | −65 | −185 | 338 | −314 | 127 |
| 127 | −237 | 314 | −350 | 338 | −280 | 185 | −65 |

In an embodiment, 4-point transform matrices for DCT-2, DCT-8 and DST-7 are defined using the following coefficients:

| DCT-2: | | | |
|---|---|---|---|
| 256 | 256 | 256 | 256 |
| 334 | 139 | −139 | −334 |
| 256 | −256 | −256 | 256 |
| 139 | −334 | 334 | −139 |

| DCT-8: | | | |
|---|---|---|---|
| 336 | 296 | 219 | 117 |
| 296 | 0 | −296 | −296 |
| 219 | −296 | −117 | 336 |
| 117 | −296 | 336 | −219 |

| DST-7: | | | |
|---|---|---|---|
| 117 | 219 | 296 | 336 |
| 296 | 296 | 0 | −296 |
| 336 | −117 | −296 | 219 |
| 219 | −336 | 296 | −117 |

FIG. 8 is a flowchart illustrating a method according to an embodiment. A method comprises determining a coding mode of a transform block 810, wherein a transform block comprises a set of transform coefficients; determining a shape of the transform block 820; determining at least one transform mode for a block based at least partly on said coding mode and said shape of the transform block 830; applying the determined transform mode to a set of transform coefficients to produce sample values 840; and adding said sample values to a block of predicted sample values 850.

An apparatus according to an embodiment comprises means for The means comprises at least one processor, and a memory including a computer program code, wherein the processor may further comprise processor circuitry. The memory and the computer program code are configured to, with the at least one processor, cause the apparatus to perform the method of FIG. 8 according to various embodiments.

Figure 9:
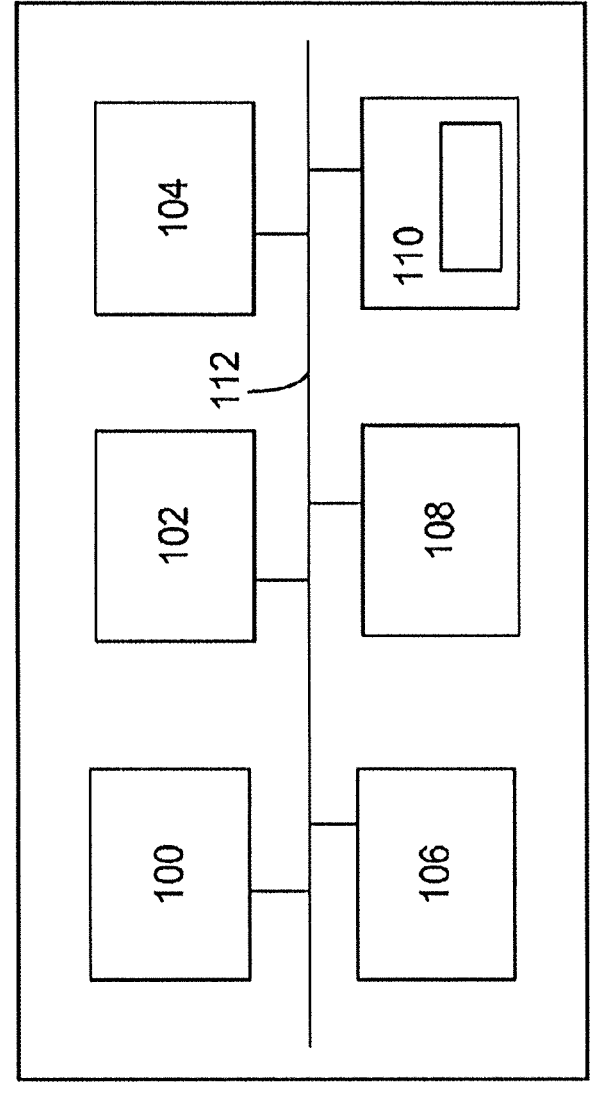
FIG. 9 shows an apparatus according to an embodiment.

An example of a data processing system for an apparatus is illustrated in FIG. 9. Several functionalities can be carried out with a single physical device, e.g. all calculation procedures can be performed in a single processor if desired. The data processing system comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100.

Computer program code resides in the memory 102 for implementing, for example the method according to flowchart of FIG. 8. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises determining a coding mode of a transform block, wherein a transform block comprises a set of transform coefficients; determining a shape of the transform block; determining at least one transform mode for a block based at least partly on said coding mode and said shape of the transform block; applying the determined transform mode to a set of transform coefficients to produce sample values; and adding said sample values to a block of predicted sample values.

The computer program code can be a part of a computer program product that may be embodied on a non-transitory computer readable medium. Alternatively, the computer program product may be downloadable via communication network.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising:
at least one processor; and
at least one memory storing instructions that, when executed by the at least one processor, cause the apparatus at least to:
determine a horizontal dimension of a transform block corresponding to a horizontal direction of the transform block and a vertical dimension of the transform block corresponding to a vertical direction of the transform block;
determine a first transform and a second transform, wherein the first transform has smaller first coefficient for its first basis function compared to a first coefficient of a first basis function of the second transform;
encode or decode the transform block using the first transform having smaller first coefficient for its first basis function for the horizontal direction and the second transform having larger first coefficient for its first basis function for the vertical direction based on the horizontal dimension of the transform block being smaller than the vertical dimension of the transform block; and
encode or decode the transform block using the first transform having smaller first coefficient for its first basis function for the vertical direction and the second transform having larger first coefficient for its first basis function for the horizontal direction based on the vertical dimension of the transform block being smaller than the horizontal dimension of the transform block.

2. The apparatus of claim 1, wherein the at least one memory stores instructions that, when executed by the at least one processor, cause the apparatus at least to:
determine whether the horizontal dimension of the transform block is the same as the vertical dimension of the transform block; and
select the first transform having the smaller first coefficient for the first basis function of the first transform for the horizontal direction of the transform block corresponding to the horizontal dimension of the transform block and for the vertical direction of the transform block corresponding to the vertical dimension of the transform block, in response to the horizontal dimension being the same as the vertical dimension.

3. The apparatus of claim 1, wherein the at least one memory stores instructions that, when executed by the at least one processor, cause the apparatus at least to:
determine whether the horizontal dimension of the transform block is the same as the vertical dimension of the transform block; and
select the second transform having the larger first coefficient for the first basis function of the second transform for the horizontal direction of the transform block corresponding to the horizontal dimension of the transform block and for the vertical direction of the transform block corresponding to the vertical dimension of the transform block, in response to the horizontal dimension being the same as the vertical dimension.

4. The apparatus of claim 1, wherein:
the first transform having the smaller first coefficient for the first basis function of the first transform comprises a discrete sine transform 7 (DST-7); and
the second transform having the larger first coefficient for the first basis function of the second transform comprises a discrete cosine transform 2 (DCT-2).

5. The apparatus of claim 4, wherein:
DST-7 is defined with a DST-7 transform matrix comprising a set of coefficients, and the smaller first coefficient is a coefficient in the first row and first column of the DST-7 transform matrix; and
DCT-2 is defined with a DCT-2 transform matrix comprising a set of coefficients, and the larger first coefficient is a coefficient in the first row and first column of the DCT-2 transform matrix.

6. The apparatus of claim 1, wherein the at least one memory stores instructions that, when executed by the at least one processor, cause the apparatus at least to:
apply the first transform and the second transform to a set of coefficients comprising the smaller first coefficient and the larger first coefficient to produce residual sample values.

7. The apparatus of claim 6, wherein the at least one memory stores instructions that, when executed by the at least one processor, cause the apparatus at least to:
add the residual sample values to a block of predicted sample values.

8. The apparatus of claim 1, wherein the at least one memory stores instructions that, when executed by the at least one processor, cause the apparatus at least to:
determine a coding mode of the transform block; and
determine the first transform and the second transform based on the coding mode of the transform block.

9. The apparatus of claim 8, wherein the at least one memory stores instructions that, when executed by the at least one processor, cause the apparatus to perform at least one or more of:
determine the coding mode to be intra prediction or inter prediction, or
determine the coding mode based on the transform block belonging to an intra slice or an inter slice.

10. The apparatus of claim 1, wherein the at least one memory stores instructions that, when executed by the at least one processor, cause the apparatus at least to:
determine a coding mode of the transform block, wherein the transform block comprises a set of coefficients;
determine a scan order for the set of transform coefficients;
determine a position of a last non-zero coefficient of the transform block in a selected scan order;
determine a transform mode based on bitstream signaling, wherein the bitstream signaling is conditioned to the position of the last non-zero coefficient of the transform block in the determined scan order; and
apply the determined transform mode to the set of transform coefficients to produce residual sample values.

11. The apparatus of claim 10, wherein the at least one memory stores instructions that, when executed by the at least one processor, cause the apparatus at least to:
determine the first transform and the second transform based on the transform mode determined based on the bitstream signaling conditioned to the position of the last non-zero coefficient of the transform block in the determined scan order.

12. The apparatus of claim 10, wherein the bitstream signaling of the transform mode is performed when a scan position of the last non-zero transform coefficient is larger than a predefined threshold.

13. The apparatus of claim 10, wherein the bitstream signaling of the transform mode is performed before encoding or decoding of the set of transform coefficients.

14. The apparatus of claim 13, wherein encoding or decoding of the set of transform coefficients is performed at least partially based on the signaled transform mode.

15. The apparatus of claim 10, wherein the transform mode comprises a discrete cosine transform (DCT) or a discrete sine transform (DST).

16. The apparatus of claim 10, wherein determining the transform mode comprises comparing a width and a height of the transform block.

17. A method comprising:
  determining a horizontal dimension of a transform block corresponding to a horizontal direction of the transform block and a vertical dimension of the transform block corresponding to a vertical direction of the transform block;
  determining a first transform and a second transform, wherein the first transform has smaller first coefficient for its first basis function compared to a first coefficient of a first basis function of the second transform;
  encoding or decoding the transform block using the first transform having smaller first coefficient for its first basis function for the horizontal direction and the second transform having larger first coefficient for its first basis function for the vertical direction based on the horizontal dimension of the transform block being smaller than the vertical dimension of the transform block; and
  encoding or decoding the transform block using the first transform having smaller first coefficient for its first basis function for the vertical direction and the second transform having larger first coefficient for its first basis function for the horizontal direction based on the vertical dimension of the transform block being smaller than the horizontal dimension of the transform block.

18. The method of claim 17, further comprising:
  determining whether the horizontal dimension is the same as the vertical dimension of the transform block; and
  selecting the first transform having the smaller first coefficient for the first basis function of the first transform for the horizontal direction of the transform block corresponding to the horizontal dimension of the transform block and for the vertical direction of the transform block corresponding to the vertical dimension of the transform block, in response to the horizontal dimension being the same as the vertical dimension.

19. The method of claim 17, further comprising:
  determining whether the horizontal dimension of the transform block is the same as the vertical dimension of the transform block; and
  selecting the second transform having the larger first coefficient for the first basis function of the second transform for the horizontal direction of the transform block corresponding to the horizontal dimension of the transform block and for the vertical direction of the transform block corresponding to the vertical dimension of the transform block, in response to the horizontal dimension being the same as the vertical dimension

20. The method of claim 17, wherein:
  the first transform having the smaller first coefficient for the first basis function of the first transform comprises a discrete sine transform 7 (DST-7); and
  the second transform having the larger first coefficient for the first basis function of the second transform comprises a discrete cosine transform 2 (DCT-2).

21. The method of claim 20, wherein:
  DST-7 is defined with a DST-7 transform matrix comprising a set of coefficients, and the smaller first coefficient is a coefficient in the first row and first column of the DST-7 transform matrix; and
  DCT-2 is defined with a DCT-2 transform matrix comprising a set of coefficients, and the larger first coefficient is a coefficient in the first row and first column of the DCT-2 transform matrix.

22. A non-transitory computer readable medium including instructions stored thereon for performing at least the following:
  determining a horizontal dimension of a transform block corresponding to a horizontal direction of the transform block and a vertical dimension of the transform block corresponding to a vertical direction of the transform block;
  determining a first transform and a second transform, wherein the first transform has smaller first coefficient for its first basis function compared to a first coefficient of a first basis function of the second transform;
  encoding or decoding the transform block using the first transform having smaller first coefficient for its first basis function for the horizontal direction and the second transform having larger first coefficient for its first basis function for the vertical direction based on the horizontal dimension of the transform block being smaller than the vertical dimension of the transform block; and
  encoding or decoding the transform block using the first transform having smaller first coefficient for its first basis function for the vertical direction and the second transform having larger first coefficient for its first basis function for the horizontal direction based on the vertical dimension of the transform block being smaller than the horizontal dimension of the transform block.

23. The non-transitory computer readable medium of claim 22, wherein the instructions stored thereon are used for performing:
  determining whether the horizontal dimension of the transform block is the same as the vertical dimension of the transform block; and
  performing one of:
    selecting the first transform having the smaller first coefficient for the first basis function of the first transform for the horizontal direction of the transform block corresponding to the horizontal dimension of the transform block and for the vertical direction of the transform block corresponding to the vertical dimension of the transform block, in response to the horizontal dimension being the same as the vertical dimension, or
    selecting the second transform having the larger first coefficient for the first basis function of the second transform for the horizontal direction of the transform block corresponding to the horizontal dimension of the transform block and for the vertical direction of the transform block corresponding to the vertical dimension of the transform block, in response to the horizontal dimension being the same as the vertical dimension.

24. The non-transitory computer readable medium of claim 22, wherein:

the first transform having the smaller first coefficient for the first basis function of the first transform comprises a discrete sine transform 7 (DST-7);

DST-7 is defined with a DST-7 transform matrix comprising a set of coefficients, and the smaller first coefficient is a coefficient in the first row and first column of the DST-7 transform matrix;

the second transform having the larger first coefficient for the first basis function of the second transform comprises a discrete cosine transform 2 (DCT-2); and DCT-2 is defined with a DCT-2 transform matrix comprising a set of coefficients, and the larger first coefficient is a coefficient in the first row and first column of the DCT-2 transform matrix.

\*　\*　\*　\*　\*